United States Patent
Barson et al.

(10) Patent No.: US 10,908,010 B1
(45) Date of Patent: Feb. 2, 2021

(54) LIQUID LEVEL MEASUREMENT DEVICE

(71) Applicant: Automation Products Group, Inc., Logan, UT (US)

(72) Inventors: Robert Dee Barson, Hyde Park, UT (US); Joseph Laethem James, Logan, UT (US); Wendel Tyrell Reidhead, Hyrum, UT (US)

(73) Assignee: Automation Products Group, Inc., Logan, UT (US)

( * ) Notice: Subject to any disclaimer, the term of this patent is extended or adjusted under 35 U.S.C. 154(b) by 0 days.

(21) Appl. No.: 16/579,654

(22) Filed: Sep. 23, 2019

(51) Int. Cl.
*G01F 23/14* (2006.01)
*G01F 23/296* (2006.01)
*G01F 23/00* (2006.01)

(52) U.S. Cl.
CPC .......... *G01F 23/14* (2013.01); *G01F 23/0061* (2013.01); *G01F 23/296* (2013.01); *G01F 23/2961* (2013.01); *G01F 23/2962* (2013.01)

(58) Field of Classification Search
CPC .... G01F 23/14; G01F 23/296; G01F 23/2961; G01F 23/2962; G01F 23/2965; G01F 23/2968
See application file for complete search history.

(56) References Cited

U.S. PATENT DOCUMENTS

| 4,534,538 A * | 8/1985 | Buckley | F24F 13/1426 |
| | | | 137/454.6 |
| 2009/0236805 A1* | 9/2009 | Dupont | G01L 19/0046 |
| | | | 277/609 |
| 2016/0025537 A1* | 1/2016 | Barkin | G01F 25/0007 |
| | | | 73/861.27 |
| 2019/0032477 A1* | 1/2019 | Huang | G01K 13/02 |

* cited by examiner

*Primary Examiner* — Paul M. West
(74) *Attorney, Agent, or Firm* — Jones Waldo Holbrook & McDonough, PC; Brent T. Winder

(57) ABSTRACT

A liquid level measurement device. The device includes a lid having a grate, wherein the grate has one or more sloped and contoured openings allowing for self-drainage. A hydrostatic measurement sensor is removably coupled to the lid. The hydrostatic measurement sensor can be removed from the lid through the grate. A base is also included. The base and the lid are connected with a ratcheting lid/base connection. An ultrasonic measurement sensor is coupled to the base.

17 Claims, 13 Drawing Sheets

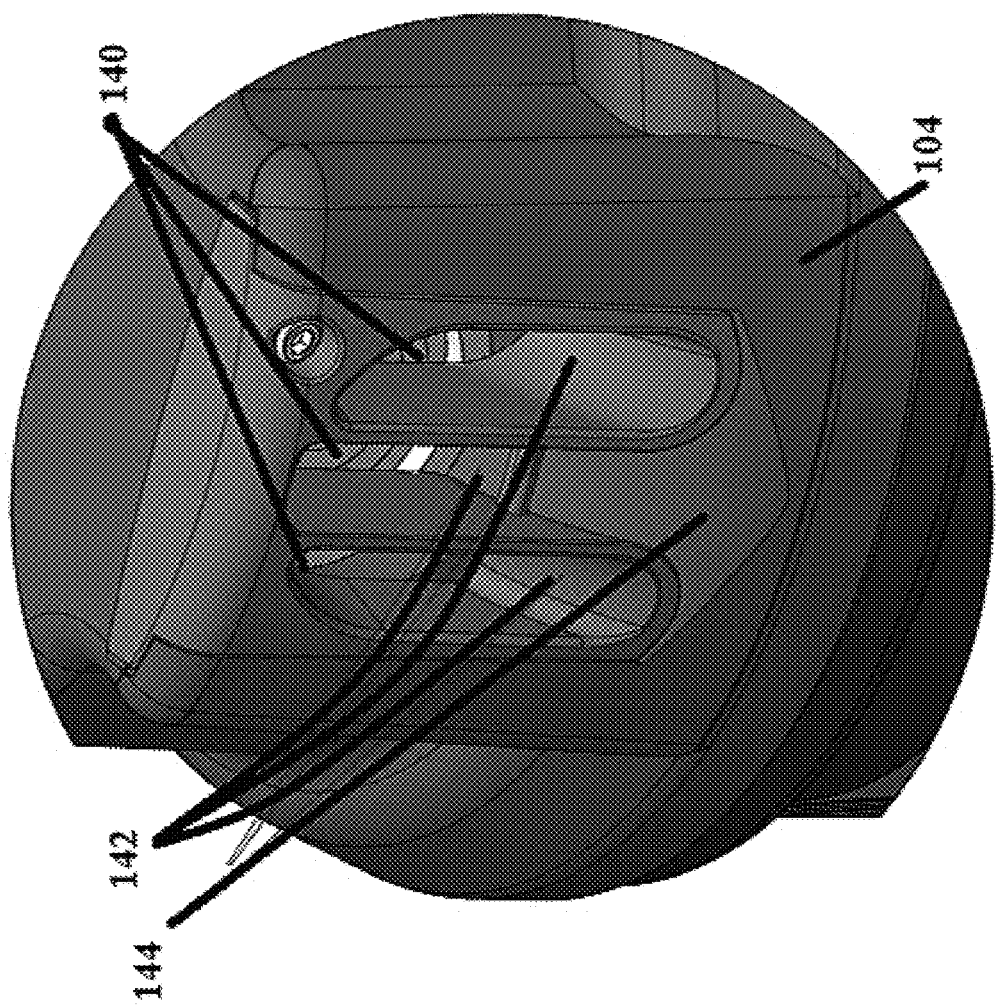
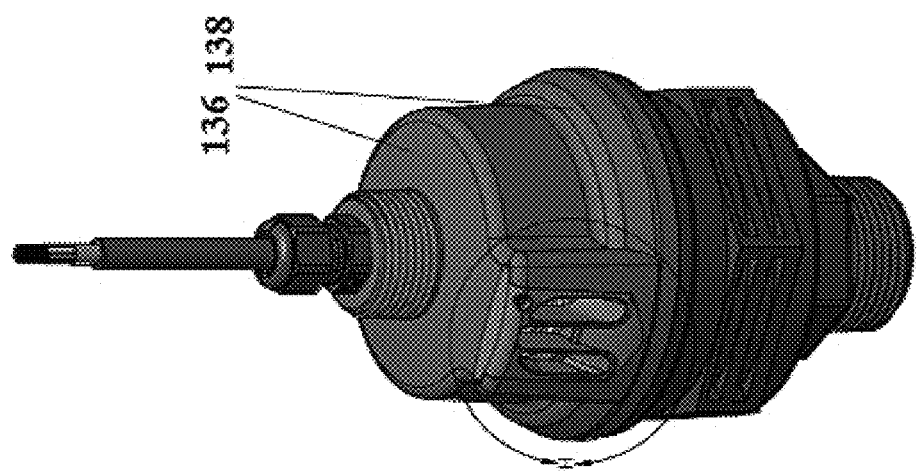
Figure 7

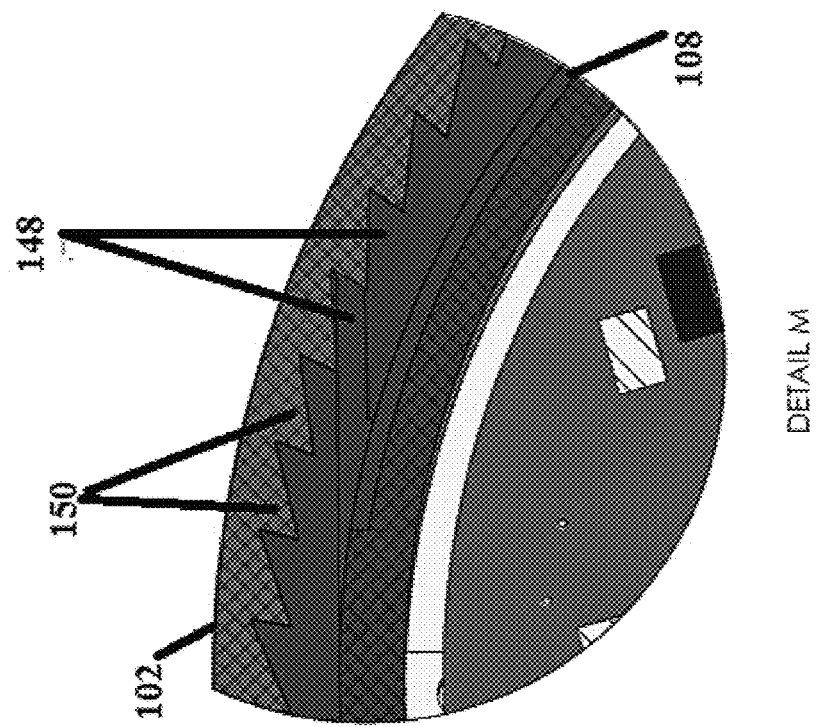
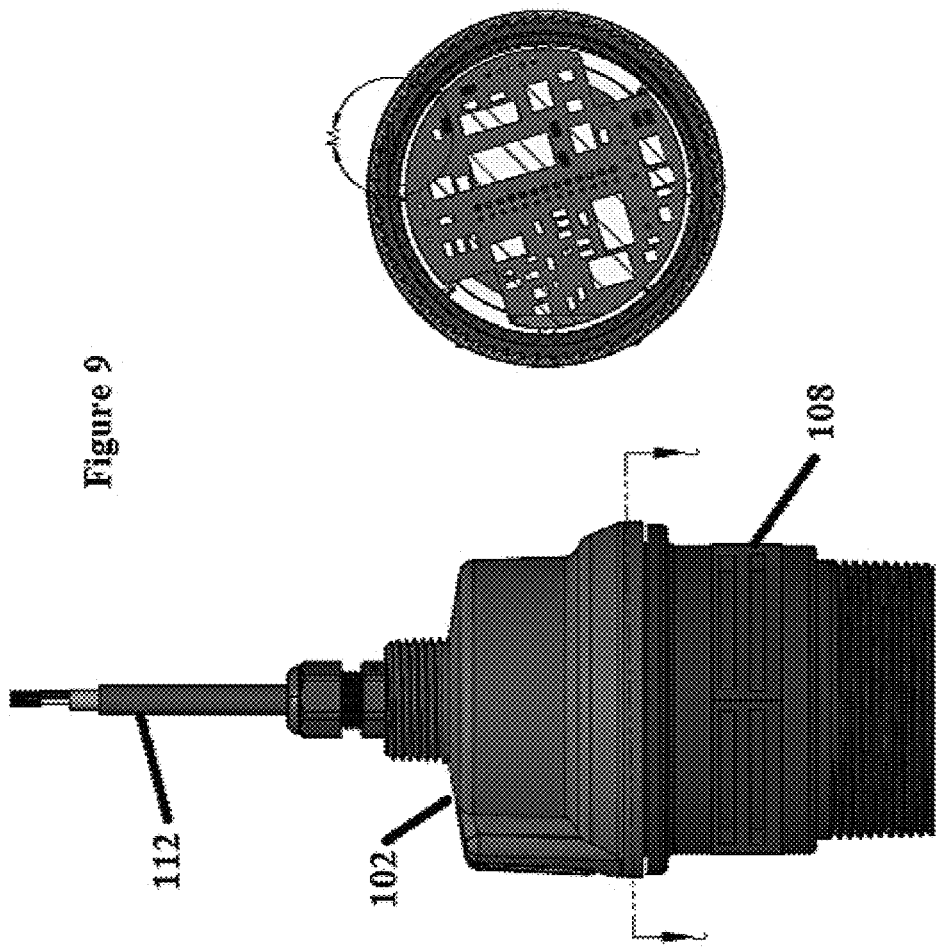
Figure 9

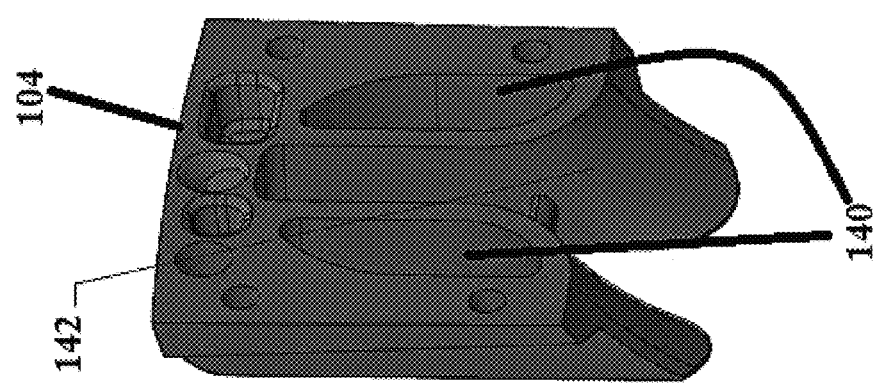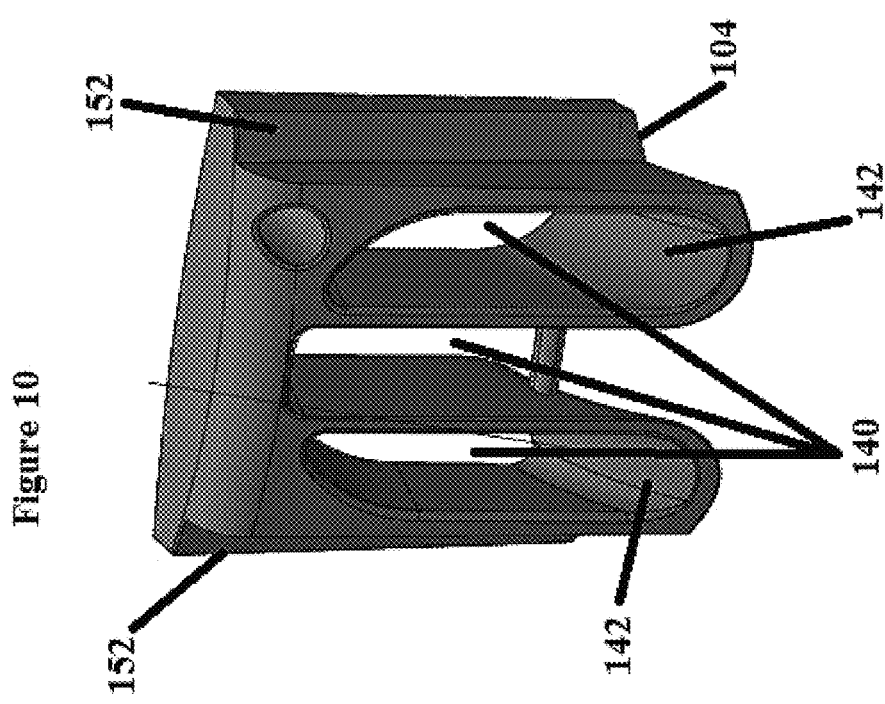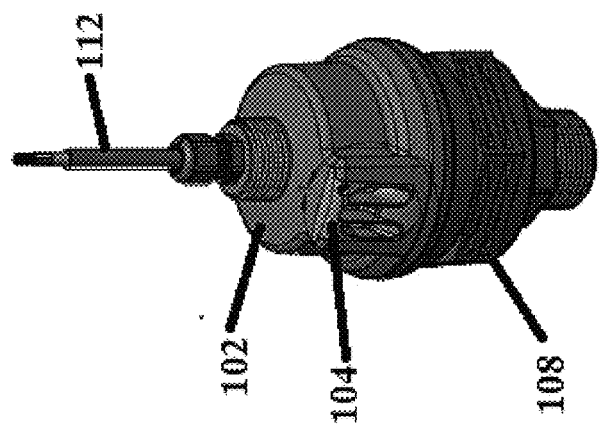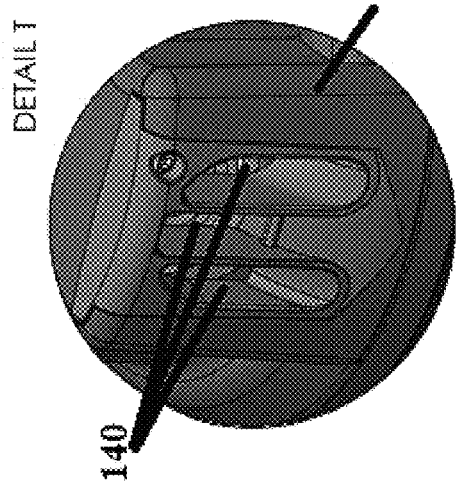
Figure 10

LIQUID LEVEL MEASUREMENT DEVICE

BACKGROUND

In liquid level measurement and more particularly in water and wastewater level monitoring, sensors are utilized to detect flow volumes and other data. For example, while not limiting the present invention to any particular application, sewer lines in a city are often monitored to alert system managers if backups are occurring. To this end, ultrasonic devices are mounted somewhere in the system. For example, in city sewer lines, ultrasonic sensors are installed under a manhole. However, one limitation with present sensor technology is that these ultrasonic sensors do not function when they are submerged. Thus, only limited level data can be obtained. Moreover, due to inadequate waterproofing, if the sensors are submerged they can be damaged or even ruined by liquid entering the system.

The present invention, in its various embodiments, addresses this limitation by including both an ultrasonic sensor and a hydrostatic sensor into a single, waterproof liquid level sensor. This combined sensor allows measurement to continue even when it is submerged allowing a user to get a continuous reading of level data.

The data stream provided by this sensor can then be interpreted by software to provide a consistent reading between ultrasonic sensor data and hydrostatic sensor data. For example, the output could be displayed as a single reading (graph, etc.) of volume, flow or whatever information is being monitored. However, in some circumstances, two data sets may be desired: one of the ultrasonic sensor data and one of the hydrostatic sensor data. The present invention allows for both types of output.

Other advantages to the present device in its various embodiments not adequately addressed by the current state of the art include, but are not limited to:

1) It allows for a hydrostatic sensor that can be easily repaired or replaced as needed.
2) The hydrostatic sensor can include self-draining features that help prevent build-up of material as the liquid measurement device is submerged and then emerges from the liquid being monitored.
3) Both the ultrasonic and hydrostatic sensors can be independently controlled allowing for both individual data output or an integrated data output.
4) The device can include a self-locking lid, which prevents liquids from entering and compromising the internal components and also guards against tampering.
5) The present device in its various embodiments can also be easily applied to existing ultrasonic base units allowing for easy installation and utilization of existing structure.
6) The present device can also include a recessed transducer face. This is advantageous as it creates a protective drip lip that keeps the transducer face clean.

SUMMARY

The present invention is a liquid level measurement device. The device includes a lid, a hydrostatic measurement sensor coupled to the lid, a base and an ultrasonic measurement sensor coupled to the base. In certain embodiments, the lid includes a grate for protecting the hydrostatic measurement sensor. In certain embodiments, the hydrostatic measurement sensor is removable. This removal can be accomplished through the grate. In certain embodiments, the ultrasonic transducer is recessed relative to the bottom surface of the base. In other embodiments, the ultrasonic transducer is substantially flush with the bottom surface of the base. Base can include a threaded surface as can lid to secure the device to a substrate. In certain embodiments, the grate has one or more openings that can be sloped or contoured to allow for self-drainage. A weight can also be removably secured to the lid. In certain embodiments, the base and the lid are connected with a ratcheting lid/base connection.

BRIEF DESCRIPTION OF THE DRAWINGS

FIG. 7 is an expanded view of a dual technology liquid level measurement device depicting a self-draining feature according to one embodiment of the present invention.

FIG. 9 depicts a sectional view of a dual technology liquid level measurement device illustrating a self-locking lid feature according to one embodiment of the present invention.

FIG. 10 depicts an expanded view of a dual technology liquid level measurement device illustrating an anti-clog grate feature according to one embodiment of the present invention.

DESCRIPTION OF ILLUSTRATED EMBODIMENTS

Figure 1:
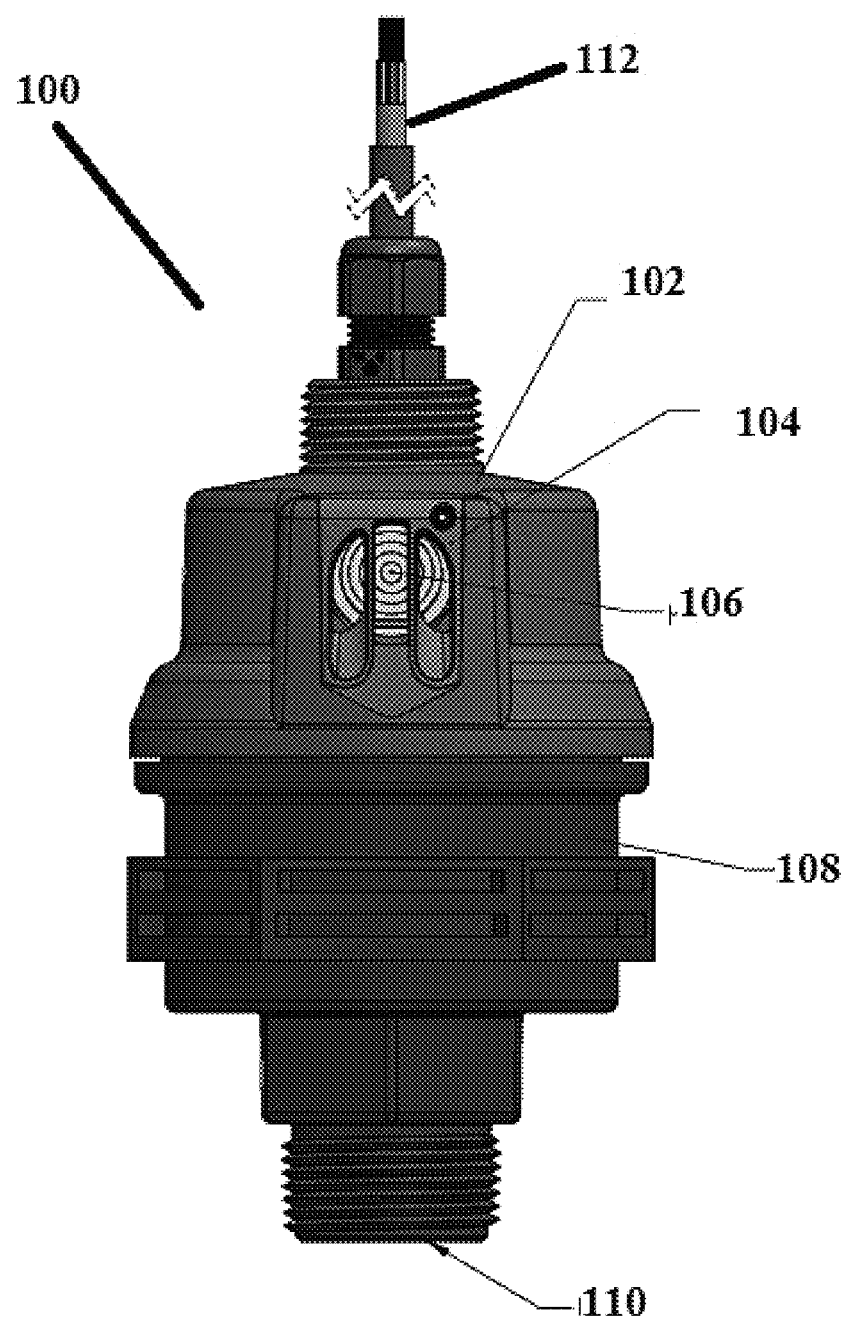
FIG. 1 is a front view of a dual technology liquid level measurement device according to one embodiment of the present invention.
Figure 2:
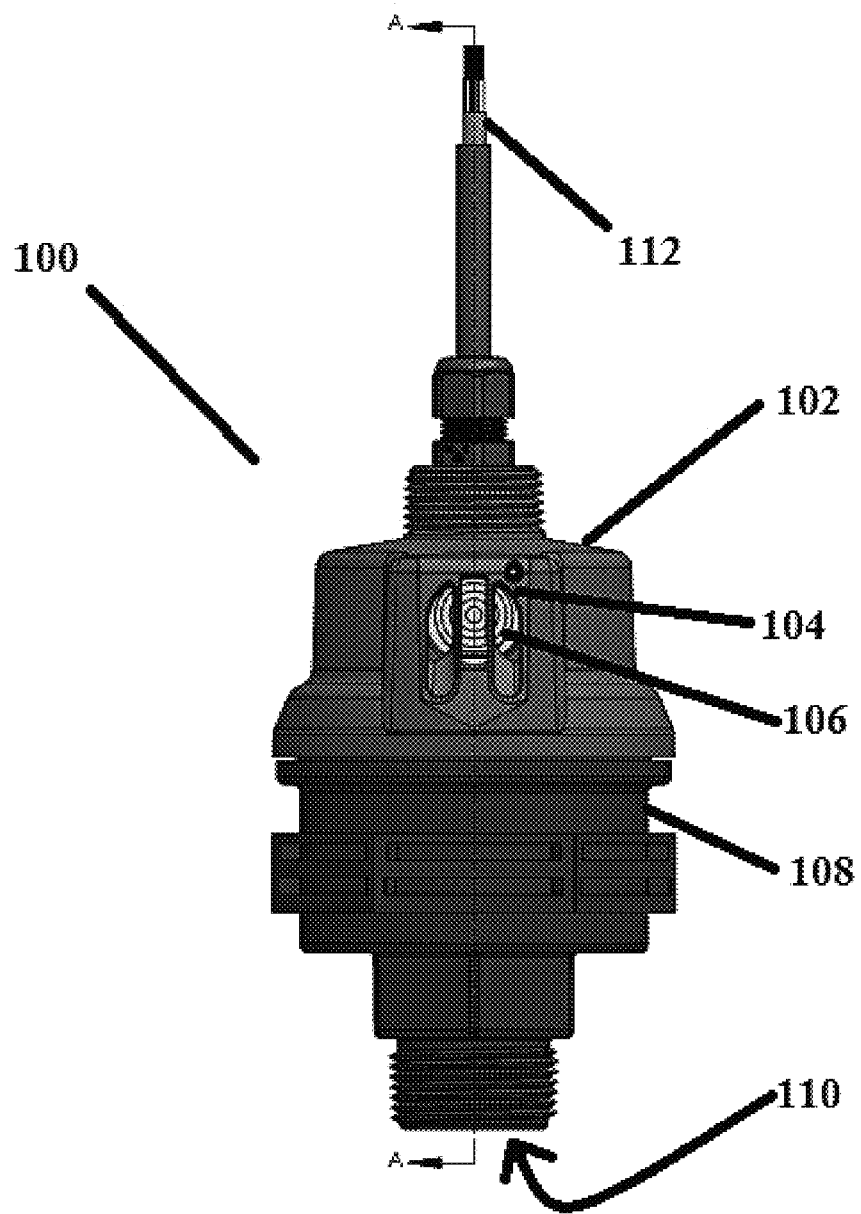
FIG. 2 is a front view of a dual technology liquid level measurement device according to one embodiment of the present invention.
Figure 3:
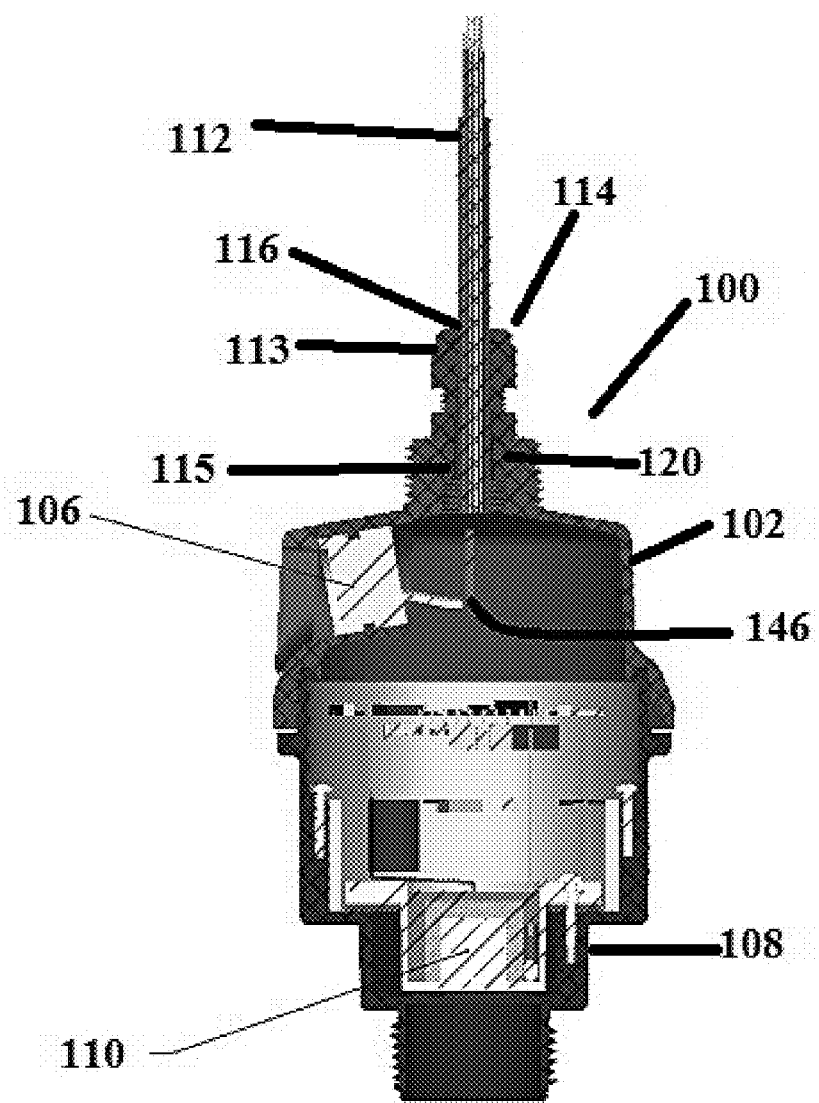
FIG. 3 is a cross-sectional view of a dual technology liquid level measurement device along line A in FIG. 2.

Referring to FIGS. 1-3, a dual technology liquid level measurement device 100 is shown according to one embodiment of the present invention. At its most basic level, the measurement device 100 includes a lid 102, a hydrostatic measurement sensor 106 in the lid 102, a base 108 and an ultrasonic measurement sensor 110 in the base 108. In the illustrated embodiment, the hydrostatic sensor 106 is removable, replaceable, and protected by a grate 104.

In one embodiment lid 102 can be made of various materials alone or in combination including, but not limited to thermoplastic polyester resins such as Valox® (available from Sabic Global Technologies B.V., Bergen Op Zoom, Netherlands), acrylonitrile butadiene styrene (ABS), nylon, polypropylene (PP), polyethylene (PE), polyvinylidene fluoride or polyvinylidene difluoride (PVDF), polytetrefluoroethylene (PTFE), Fluorinated ethylene propylene (FEP), stainless steel, and mild steel alone or in combination. In one embodiment, the base 108 can be made of various materials alone or in combination including, but not limited to Valox®, ABS, nylon, PP, PE, PVDF, PTFE, FEP, stainless steel and mild steel alone or in combination. In one embodiment grate 104 can be made of various materials alone or in combination including, but not limited to Valox®, ABS, nylon, PP, PE, PVDF, PTFE, FEP, stainless steel, and mild steel alone or in combination.

In the illustrated embodiment, the hydrostatic sensor 106 is a commercially available sensor such as Model PCM10 MEMS Pressure Sensor manufactured by WT Sensor (Nanjing, China). Other hydrostatic sensors 106 suitable for use with the present invention include, but are not limited to other commercially available micro-electromechanical systems (MEMS) pressure sensors as would be apparent to one skilled in the art and are considered within the scope of the present invention.

In the illustrated embodiment, the ultrasonic measurement sensor 110 is a TD-COR-143 kHz manufactured by ABM Sensor Technology Inc. (Ontario, Canada). Other commercially available ultrasonic measurement sensors as would be apparent to one skilled in the art are suitable for use with the present invention and are considered within the scope of the present invention.

Figure 8:
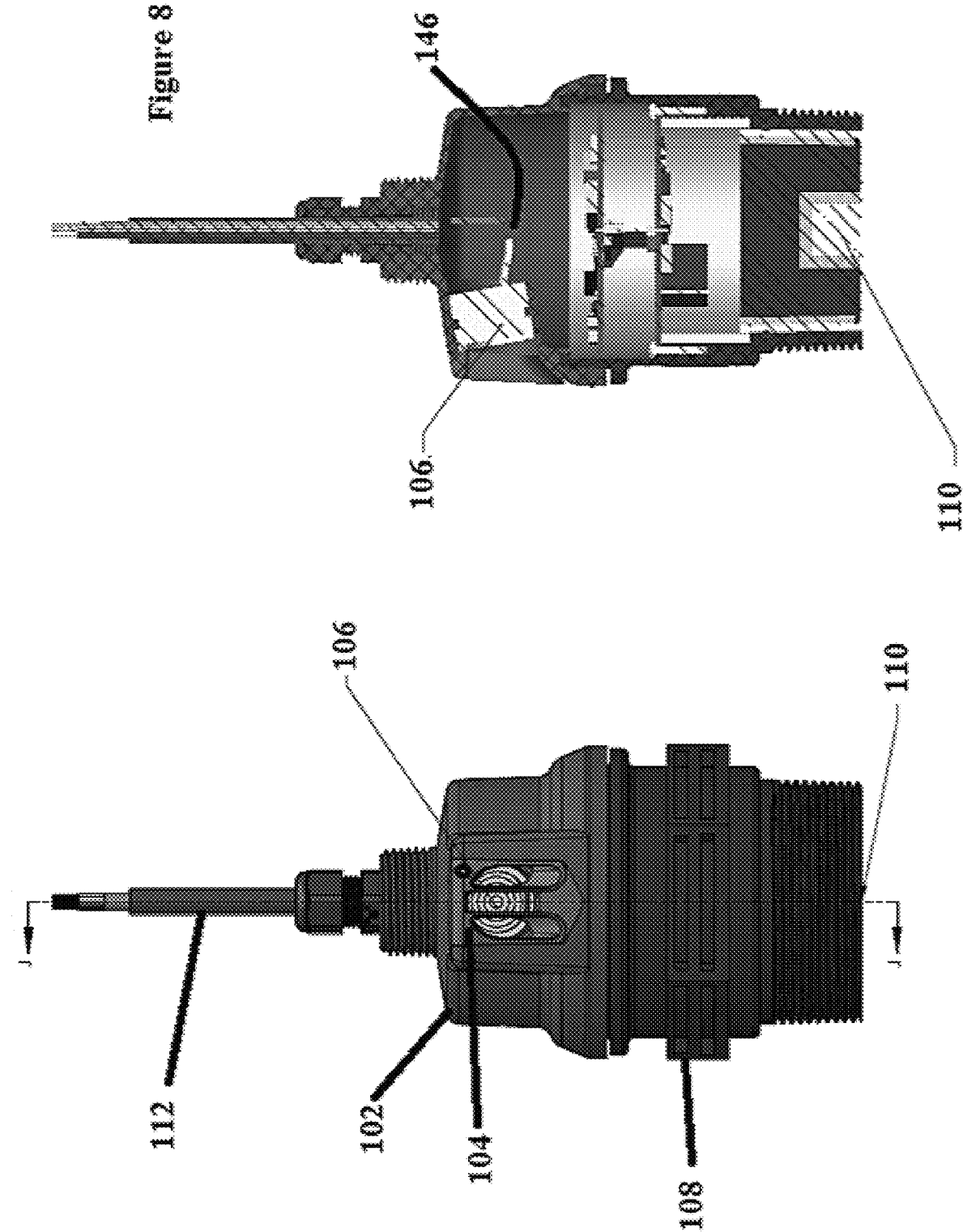
FIG. 8 depicts a sectional view of a dual technology liquid level measurement device illustrating independent wiring of hydrostatic sensor and ultrasonic sensor according to one embodiment of the present invention.

FIG. 3 is a cross-sectional view of a dual technology liquid level measurement device 100 along line A in FIG. 2. FIG. 3 illustrates the internal relative placement of the hydrostatic measurement sensor 106 in the lid 102 and the ultrasonic measurement sensor 110 in the base 108. Element 146 depicts the wires for hydrostatic sensor 106 leading up to cable 112 by which the hydrostatic sensor 106 can be powered and communicate with external processing equipment such as a computer. Similarly, the ultrasonic measurement sensor 110 can also be in electronic communication with external processing equipment and power supply through cable 112. It is noted however that, in certain embodiments, the wiring 146 for the hydrostatic sensor 106 is independent of the wiring for the ultrasonic measurement sensor 110 as depicted in FIG. 8. Although not depicted in the current illustration, in certain embodiments both the hydrostatic sensor 106 and the ultrasonic sensor 110 can be in electronic communication with external processing equipment and power supply through cable 112.

Wiring 146 for the hydrostatic sensor 106 and wiring (not shown) for the ultrasonic measurement sensor 110 is copper wiring. In certain embodiments, the wiring is simply multistrand, multi-conductor copper wire.

Figure 4:
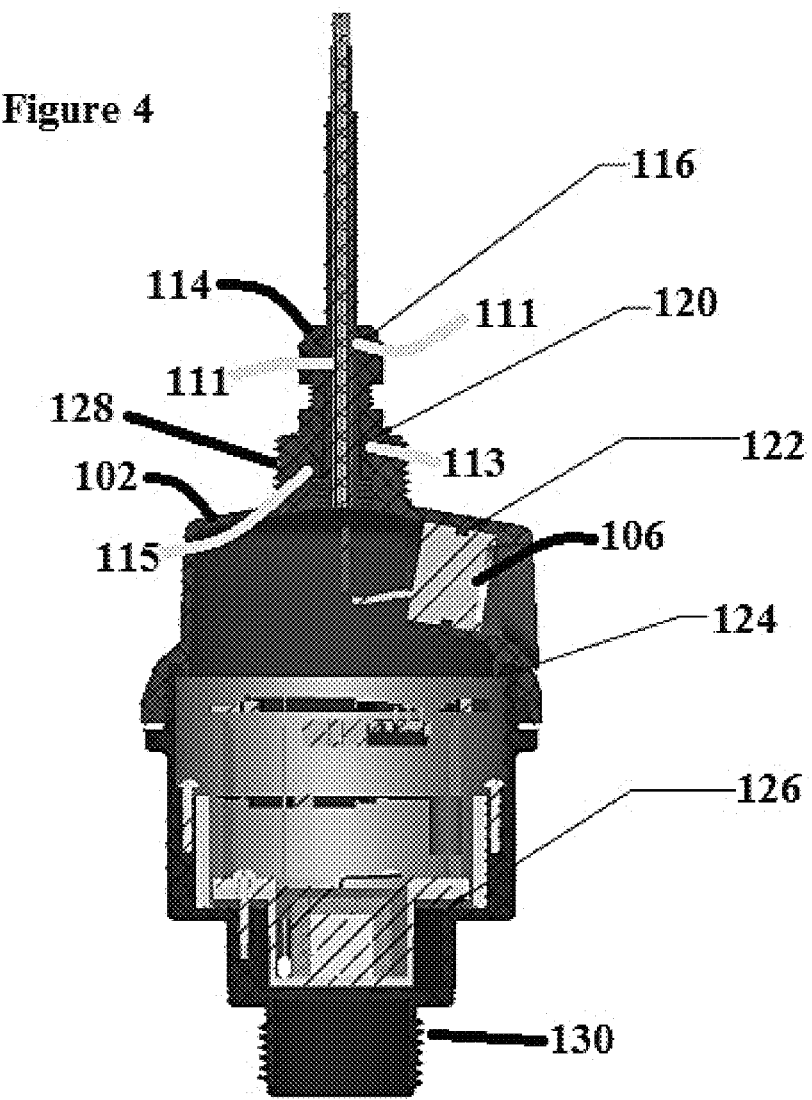
FIG. 4 is a sectional view of a recessed mount dual technology liquid level measurement device depicting seal locations according to one embodiment of the present invention.
Figure 5:
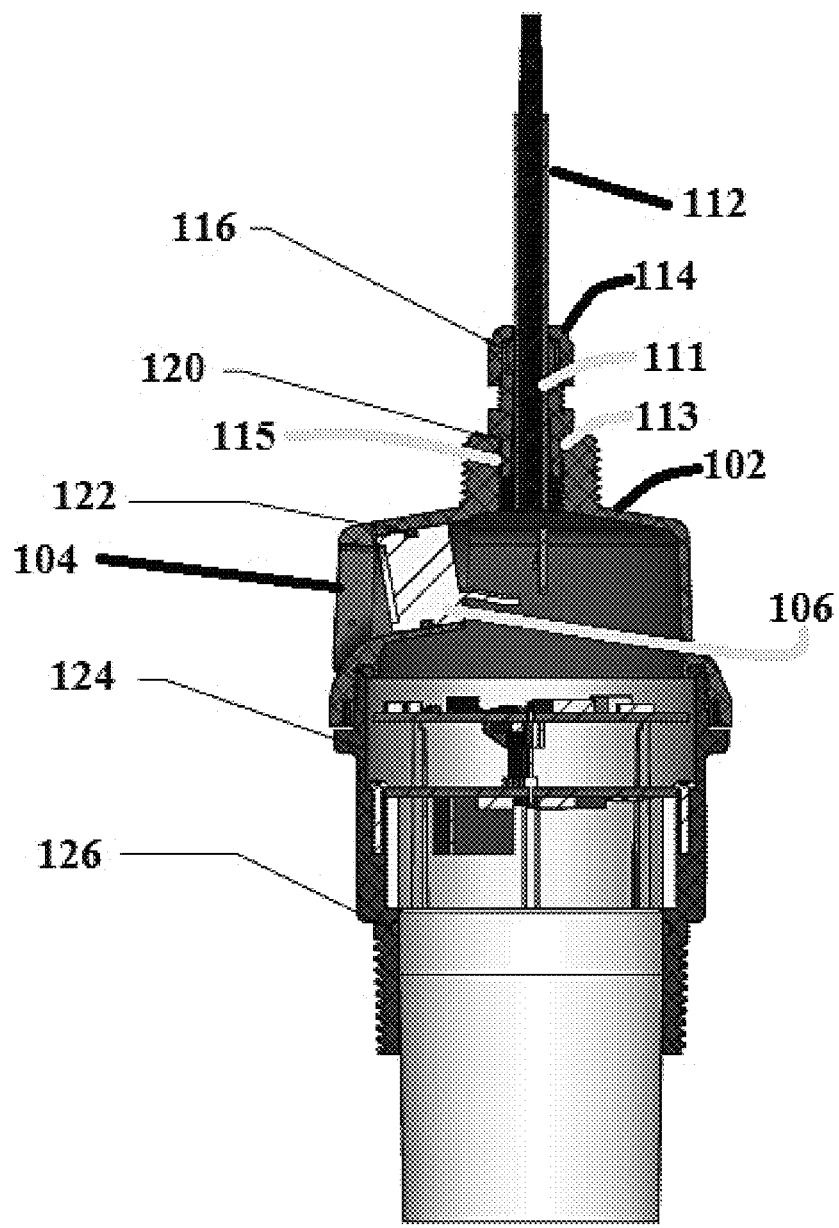
FIG. 5 is a sectional view of a flush mount and extended mount dual technology liquid level measurement device depicting seal locations according to one embodiment of the present invention.

Referring now to FIGS. 4 and 5, a sectional view of a dual technology liquid level measurement device 100 is shown. FIG. 4 depicts a recessed mount measurement device. "Recessed" mount refers to the ultrasonic transducer's face location relative to end of the threaded portion of the base (108, 126, 130). For example, FIG. 8 shows the ultrasonic transducer face flush with the threaded portion of the base. FIGS. 3 and 4 show the ultrasonic transducer face recessed inside the threaded portion of the external base 130. In contrast, FIG. 5 depicts the seals in a flush mount and extended mount configuration. In particular, FIG. 5 shows the transducer face (the bottom of the cup) extended past the external threaded base 126.

One advantage to the present liquid level measurement device 100 is its ability to be fully submerged. In the presently illustrated embodiments, this can be accomplished through a series of seals. Referring to both FIGS. 4 and 5, a cable gland 114 provides structural support to cable 112 and secures it to lid 102. Where interior walls 111 of cable gland 114 wrap around cable 112 it creates a watertight fit and first seal 116.

At the junction of the cable gland 114 and the lid 102, the exterior 113 of cable gland 114 presses against the inner wall 115 of an opening in lid 102 creating a watertight fit and second seal 120.

There is also third seal 122 that prevents liquids from passing the hydrostatic sensor 106 and thereby compromising the internal components of the measurement device 100. The seal 122 depicted in this embodiment is a sealant seated into a groove on the hydrostatic sensor 106. The sealant could be numerous known mechanisms including rubber, silicone or plastic gaskets or O-rings. In some embodiments, no groove in the hydrostatic sensor 106 is included. In other embodiments, known liquid or gel sealants could be utilized.

As better illustrated in FIG. 9, the junction of the lid 102 and base 108 can include a mechanism that creates a fourth seal 124. In the illustrated embodiment, base 108 includes one or more ratchet arms 148. Lid 102 includes corresponding ratchet teeth 150. As lid 102 is screwed onto base 108, ratchet arms 148 engage ratchet teeth 150 on the lid 102 preventing the lid 102 from being unscrewed without permanent damage. This ensures the base to lid seal 124 remains tight and prevents tampering. It is however noted that, in certain embodiments, the relative placement of the ratchet arms 148 and ratchet teeth 150 could be reversed with the teeth 150 on base 108 and the arms 148 on lid 102.

Lastly, referring to FIGS. 4 and 5 again, there can be a fifth seal 126 at the junction of the base 108 and the ultrasonic sensor 110. The ultrasonic transducer is assembled inside of a cup (extending beneath bottom of base 108 in FIG. 5). The cup needs to be sealed at the interfaces between the base and the cup. For the extended and flush mount versions, this is accomplished by an O-ring designed into the base and cup inserted to a specific location so the O-ring seals against the cup and base. For the recessed mount (FIGS. 3 and 4), the cup has a flange and a custom gasket and washer. Screws or other fastening mechanisms can also be used to compresses the cup into the gasket and the gasket into the base.

Base 108 and lid 102 can also include threading 130, 128 (FIG. 4) respectively. This threading 130, 128 allows easy and more secure installation. For example, typically a unit such as this is hung by the cable 112. Including threaded portions 130, 128 allows for a more secure installation of both the base and the lid. A secure connection at the lid can also be particularly important if the application requires a conduit connection for the cable.

Figure 6:
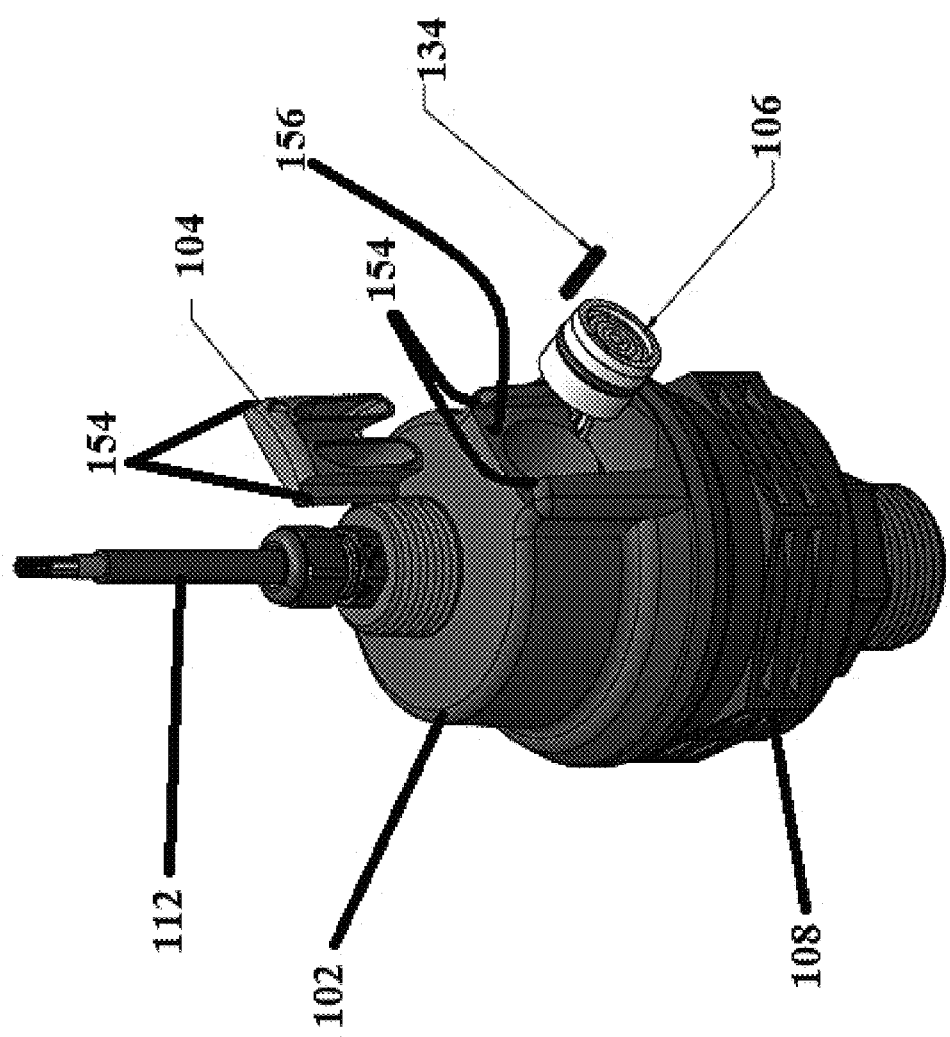
FIG. 6 is an elevated perspective view of a dual technology liquid level measurement device according to one embodiment of the present invention.

One advantage to the liquid level measurement device 100 is the interchangeability of the hydrostatic sensor 106. For example, if the hydrostatic sensor 106 becomes damaged or broken in operation, the present invention allows for easy access for repair or replacement. FIG. 6 is an elevated perspective view of a dual technology liquid level measurement device 100 depicting removal of the hydrostatic sensor 106 according to one embodiment of the present invention.

Referring to FIG. 6 in combination with FIG. 10, access to the hydrostatic sensor 106 can be accomplished through a sensor grate 104.

Sensor grate 104 can include one or more openings 140. These openings 140 can further include slopes and contours 142. Additional contouring 144 in the sensor grate 104 can also be included. The slopes and contours on the sensor grate 104 create a self-draining feature that helps prevent build-up of material as the liquid measurement device 100 is submerged and then emerges from the liquid.

In the illustrated embodiment, grate 104 can include one or more protrusions 152 (FIG. 10) that correspond to openings 154 (FIG. 6) in the lid 102. Thus, as grate 104 is pressed down protrusions 152 seat in opening 154 securing grate 104 in place. A set screw 134 or other similar securing device can also be included to further secure grate 104 to lid 102. In the illustrated embodiment, hole 156 is provided for set screw 134. Screw 134 locks grate 104 in place and prevents it from sliding upward out of the lid 102. Referring to FIG. 7, lid 102 can also include contours 136, 138 that, similar to contours in grate 142, 144 are sloped to help prevent stagnation locations and promote self-draining.

Figure 11:
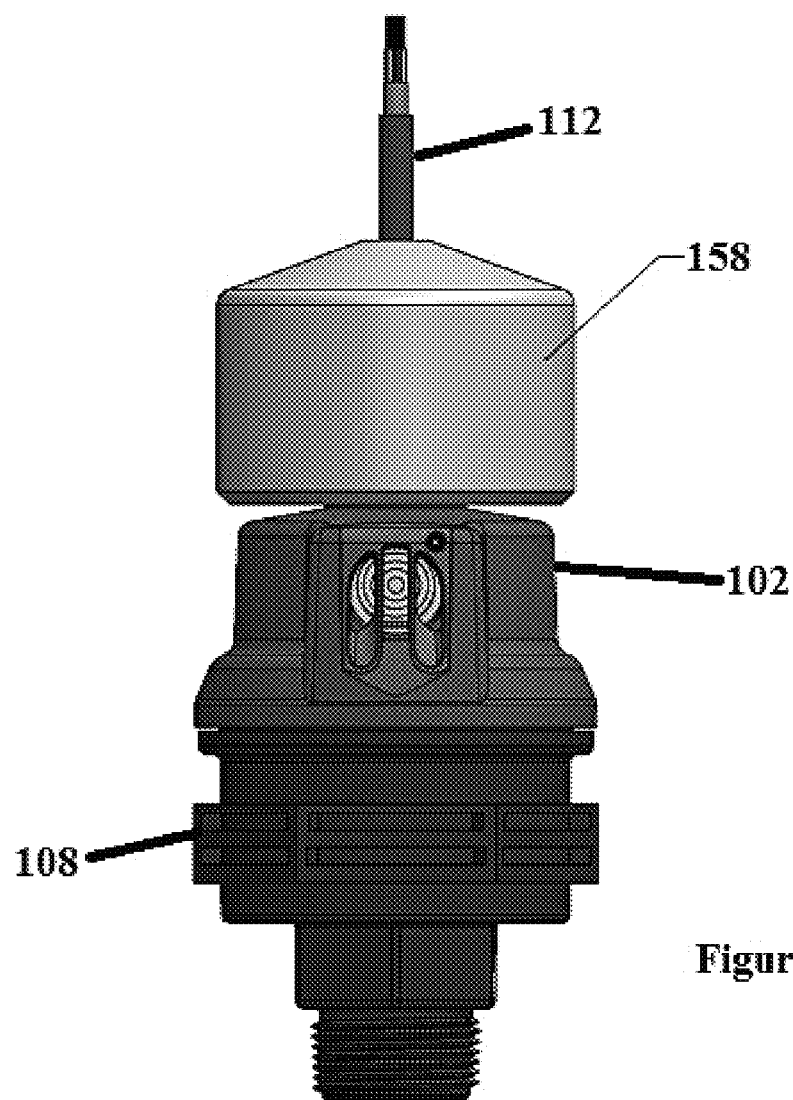
FIG. 11 is a front view of a dual technology liquid level measurement device featuring a weight according to one embodiment of the present invention.

Referring now to FIG. 11, a weight 158 can be added to the liquid level measurement device 100 to assist with stability in turbulent flow applications. In the illustrated embodiment, cable 112 is threaded through weight 158 and weight 158 sits substantially on top of the lid 102. This placement of the weight 158 is advantageous in that it allows the added stability but is not positioned such that it interferes with the operation of the sensors. A single piece, annular weight 158 is advantageous as it is easy to manufacture and install. However, in certain embodiments, it may be advantageous to have the weight 158 be an assembly of multiple pieces. In yet other embodiments, more than one weight 158 may be utilized.

Figure 12:
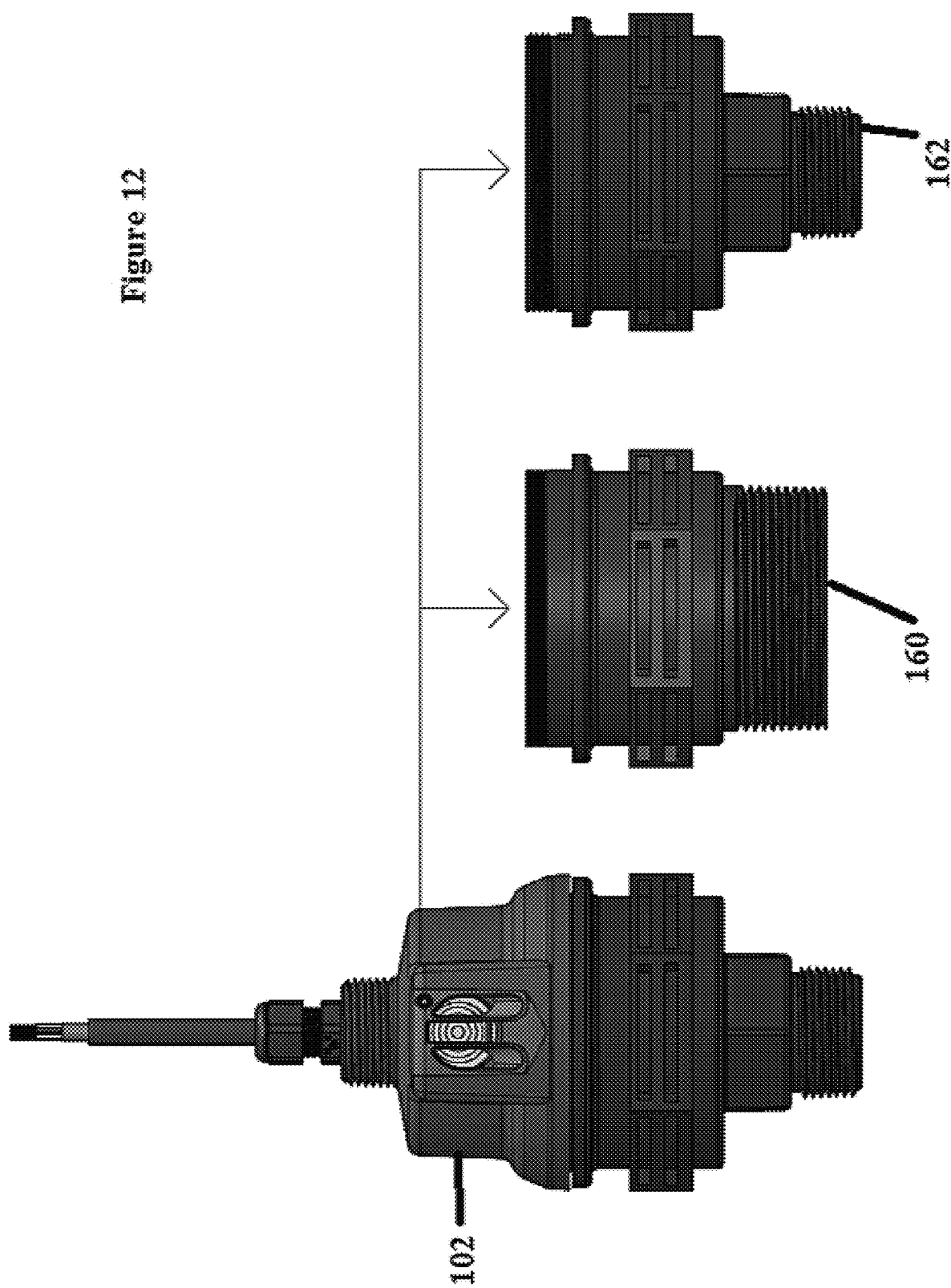
FIG. 12 is a front view of a dual technology liquid level measurement device illustrating its compatibility with various independent ultrasonic base units according to one embodiment of the present invention.

FIG. 12 is a front view of a dual technology liquid level measurement device 100 illustrating the compatibility of the lid 102 with various independent ultrasonic base units 108 according to one embodiment of the present invention. In FIG. 12, a two-inch base 160 and a one-inch base 162 onto which lid 102 can be applied are shown.

Figure 13:
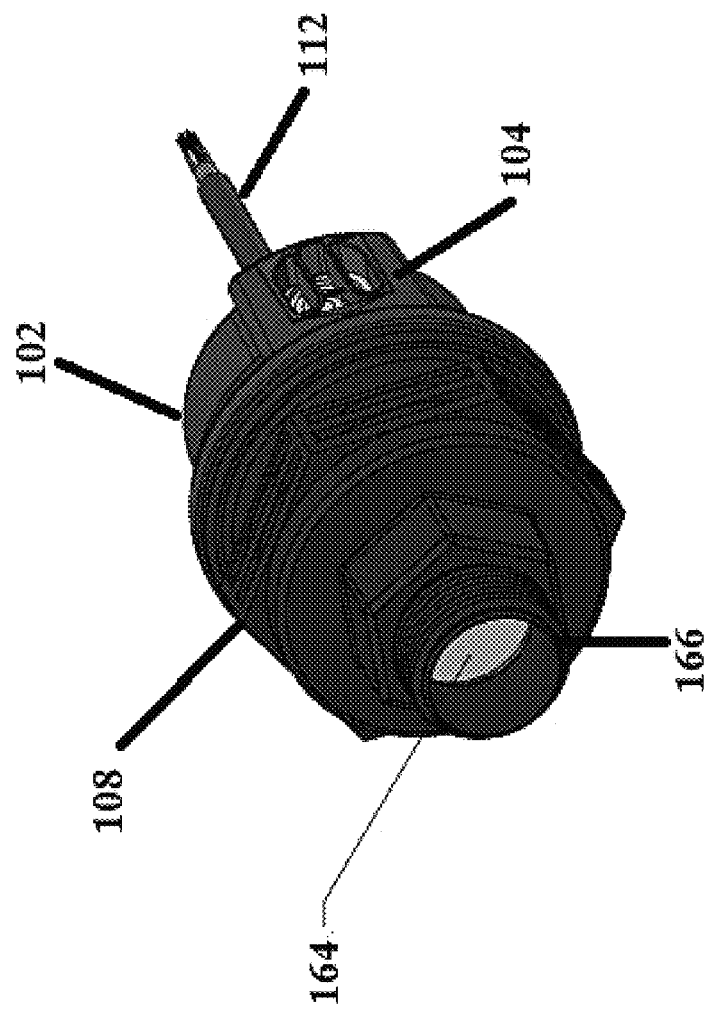
FIG. 13 is a bottom perspective view of a dual technology liquid level measurement device according to one embodiment of the present invention.

FIG. 13 is a bottom perspective view of a dual technology liquid level measurement device 100 illustrating a recessed transducer face 164 according to one embodiment of the present invention. In particular, the base 108 includes a hollow protrusion 166 that encircles the transducer face 164 creating a protective barrier. The depth of the protrusion 166 and thus barrier can vary depending on need and circumstance. For example, in one embodiment, the protrusion 166 has a two-inch depth. In another embodiment, the protrusion 166 has a one-inch depth. A recessed transducer face 164 is also advantageous as it can create a protective drip lip that keeps the transducer face 164 clean.

Numerous other modifications and alternative arrangements may be devised by those skilled in the art without departing from the spirit and scope of the present invention. While the present invention has been described and illustrated in the context of the embodiments discussed above, numerous changes, modifications and substitutions of equivalents may be made without departing from the spirit and scope of this invention which is intended to be unlimited by the foregoing except as may appear in the following appended claims.

What is claimed is:

1. A liquid level measurement device comprising:
 a lid;
 a hydrostatic measurement sensor coupled to the lid, wherein the lid includes a grate for protecting the hydrostatic measurement sensor and wherein the grate has one or more sloped and contoured openings allowing for self-drainage;
 a base; and
 an ultrasonic measurement sensor coupled to the base.

2. The liquid level measurement device of claim 1, wherein the hydrostatic measurement sensor is removable.

3. The liquid level measurement device of claim 2, wherein the hydrostatic measurement sensor is removable through the grate.

4. The liquid level measurement device of claim 1, wherein the ultrasonic transducer is recessed relative to a bottom surface of the base.

5. The liquid level measurement device of claim 1, wherein the ultrasonic transducer is substantially flush with a bottom surface of the base.

6. The liquid level measurement device of claim 1, further comprising a threaded surface on the base.

7. The liquid level measurement device of claim 1, further comprising a threaded surface on the lid.

8. The liquid level measurement device of claim 1, further comprising a weight removably secured to the lid.

9. The liquid level measurement device of claim 1, wherein the base and the lid are connected with a ratcheting lid/base connection.

10. A liquid level measurement device comprising:
 a lid having a grate, wherein the grate has one or more sloped and contoured openings allowing for self-drainage;
 a hydrostatic measurement sensor removably coupled to the lid, wherein the hydrostatic measurement sensor is removed from the lid through the grate;
 a base, wherein the base and the lid are connected with a ratcheting lid/base connection; and
 an ultrasonic measurement sensor coupled to the base.

11. The liquid level measurement device of claim 10, wherein the ultrasonic transducer is recessed relative to a bottom surface of the base.

12. The liquid level measurement device of claim 10, wherein the ultrasonic transducer is substantially flush with a bottom surface of the base.

13. The liquid level measurement device of claim 10, further comprising a threaded surface on the base.

14. The liquid level measurement device of claim 10, further comprising a threaded surface on the lid.

15. The liquid level measurement device of claim 10, further comprising a weight removably secured to the lid.

16. The liquid level measurement device of claim 10, wherein the lid is made of one or more materials selected from the group consisting of thermoplastic polyester resins, acrylonitrile butadiene styrene, nylon, polypropylene, polyethylene, polyvinylidene fluoride, polyvinylidene difluoride, polytetrefluoroethylene, fluorinated ethylene propylene, stainless steel and mild steel.

17. The liquid level measurement device of claim 10, wherein the base is made of one or more materials selected from the group consisting of thermoplastic polyester resins, acrylonitrile butadiene styrene, nylon, polypropylene, polyethylene, polyvinylidene fluoride, polyvinylidene difluoride, polytetrefluoroethylene, fluorinated ethylene propylene, stainless steel and mild steel.

* * * * *